United States Patent

Jakkula et al.

[11] Patent Number: 6,009,760
[45] Date of Patent: Jan. 4, 2000

[54] METHOD OF MEASURING FLOW, AND FLOW METER

[75] Inventors: Pekka Jakkula, Oulu; Kari Luostarinen, Jyväskylä; Esko Tahkola, Kiviniemi, all of Finland

[73] Assignee: Valmet Automation Inc., Helsinki, Finland

[21] Appl. No.: 09/109,162

[22] Filed: Jun. 30, 1998

[30] Foreign Application Priority Data

Jul. 4, 1997 [FI] Finland ..................................... 972867

[51] Int. Cl.[7] .............................. G01F 1/712; G01F 1/708
[52] U.S. Cl. ...................................... 73/861.06; 73/861.05
[58] Field of Search .................. 324/58.5; 73/861.04, 73/861.05, 861.06, 861.09

[56] References Cited

U.S. PATENT DOCUMENTS

| | | | |
|---|---|---|---|
| 4,019,038 | 4/1977 | Critten et al. | 73/861.06 |
| 4,228,353 | 10/1980 | Johnson | 73/861.06 |
| 4,423,623 | 1/1984 | Ho et al. | 324/58.5 |
| 4,659,982 | 4/1987 | Van De Velde | 73/861 |
| 4,708,021 | 11/1987 | Braun et al. | 73/861.06 |
| 4,888,547 | 12/1989 | McGinn et al. | 324/58.5 |
| 4,976,154 | 12/1990 | Schneider et al. | 73/861.06 |
| 5,121,639 | 6/1992 | McShane | 73/861.06 |
| 5,261,282 | 11/1993 | Grabowski et al. | 73/861.05 |
| 5,502,393 | 3/1996 | Yamaguchi et al. | 324/639 |
| 5,654,551 | 8/1997 | Watt et al. | 73/861.04 |
| 5,741,979 | 4/1998 | Arndt et al. | 73/861 |
| 5,837,902 | 11/1998 | Veneruso et al. | 73/861.06 |

FOREIGN PATENT DOCUMENTS

| | | |
|---|---|---|
| 2194058 | 2/1988 | United Kingdom . |
| 9313390 | 7/1993 | WIPO . |
| 9417374 | 8/1994 | WIPO . |
| WO94/17373 | 8/1994 | WIPO . |

*Primary Examiner*—William Oen
*Attorney, Agent, or Firm*—Ladas & Parry

[57] ABSTRACT

A flow meter for measuring the flow in a dielectric pipe is disclosed. Two microwave signals are transmitted at measurement points via at least two transmitter antennae through the dielectric pipe and a flowing material. The distance between the measurement points is known. The signals that have passed through are received by receiver antennae and signal cross correlation is formed by a correlator, the flow rate being determined on the basis of the best correlation result. The measurement result is improved by filtering and/or directing the signals.

31 Claims, 4 Drawing Sheets

METHOD OF MEASURING FLOW, AND FLOW METER

FIELD OF THE INVENTION

The invention relates to a method of measuring the flow in a dielectric pipe or the like.

The invention also relates to a flow meter, arranged to measure the flow in a dielectric pipe or the like.

The invention further relates to a flow meter, arranged to measure the flow in a dielectric pipe or the like, the flow meter comprising a transmitter and a receiver.

BACKGROUND OF THE INVENTION

Flow meters are usually employed for measuring the flow of a liquid material in a pipe. Prior art meters are of several types and they are typically based on such physical phenomena as the Coriolis force, pressure difference and voltage induced by the movement of a conductive material in the magnetic field. Furthermore, ultrasound techniques have been used to implement meters based on correlation and the Doppler effect. Microwave techniques have also been used to implement flow meters based on the Doppler effect. Solutions utilizing microwave correlation by using a metallic process pipe are also known, e.g. U.S. Pat. Nos. 4,423,623, 4,888,547 and WO patent publication 94/17373. In the solutions according to U.S. Pat. Nos. 4,423,623 and 4,888,547, the process pipe is used as a wave guide and the variations in the cut-off frequency of the wave guide act as correlating signals. In the solution of WO patent publication 94/17373, the correlation of signals at the same frequency or at least in the same frequency band is utilized after the signals have passed through a flowing material.

These techniques involve a plurality of drawbacks. For example, the problem in ultrasound measurement is that it is difficult to make ultrasound move from the transmitter sensor to the dielectric material of the tube wall and further to the material flowing inside the tube. However, it is particularly difficult to apply the above methods to pneumatic pipelines, since a magnetic flow meter, for instance, requires an adequately high electric conductivity of the material to be measured; a property which materials flowing in pneumatic transfer lines usually lack. Prior art solutions based on microwave techniques typically (U.S. Pat. Nos. 4,423,623 and 4,888,547) do not allow measurement of e.g. the flow of pulp in dielectric conduits, such as a rubber tube. In the solution according to WO patent publication 94/17373, in turn, the signals of different transmitter antennae interfere with each other upon receiving.

BRIEF DESCRIPTION OF THE INVENTION

It is thus an object of the invention to provide a method and an apparatus according to the method so as to be able to measure the flow of materials with poor electric conductivity even materials flowing in dielectric conduits without breaking pipes and without interference between the signals received.

This is achieved by a method of the type presented in the introduction, characterized by transmitting at least two microwave signals at different frequencies through the dielectric pipe from measurement points a known distance apart, the signals that have passed through being received, and the cross correlation or the like between at least two signals being formed, the flow rate being determined on the basis of the best correlation result.

The method of the invention is also characterized by transmitting at least two microwave signals at the same frequency but polarized in different ways, through the dielectric pipe from measurement points a known distance apart, the signals that have passed through being separated upon reception from each other by polarization antennae, and the cross correlation or the like between said at least two signals being formed, the flow rate being determined on the basis of the best correlation result.

The method of the invention is further characterized by transmitting at least two microwave signals at the same frequency but modulated in different ways, through the dielectric pipe from measurement points a known distance apart, the signals that have passed through being received, separated from each other by demodulation, and the cross correlation or the like between said at least two signals being formed, the flow rate being determined on the basis of the best correlation result.

The flow meter of the invention, in turn, is characterized in that the flow meter comprises at least two transmitters at different frequencies and a receiver, at least two transmitter antennae and two receiver antennae, the transmitter antennae being arranged to transmit at least two microwave signals at different frequencies from at least two different measurement points through the dielectric pipe, and the receiver antennae being arranged to receive signals that have passed through the dielectric pipe, and the flow meter comprising a correlator for forming the cross correlation or the like between at least two signals, whereby, the distance between the measurement points being known, the flow meter is arranged to use the best correlation result to determine the flow rate.

The flow meter of the invention is also characterized in that the flow meter comprises at least two transmitter antennae, at least two receiver antennae, modulators arranged to modulate signals in different ways, and demodulators, the transmitter antennae being arranged to transmit at least two microwave signals at the same frequency but modulated in different ways from at least two different measurement points through the dielectric pipe, and the receiver antennae being arranged to receive the signals that have passed through the dielectric pipe, the demodulators being arranged to separate the received signals by demodulation, and the flow meter comprising a correlator for forming the cross correlation or the like between said at least two signals, whereby, the distance between the measurement points being known, the flow meter is arranged to use the best correlation result to determine the flow rate.

The flow meter of the invention is further characterized in that the flow meter comprises at least two polarization transmitter antennae and two polarization receiver antennae, the polarization transmitter antennae being arranged to transmit at least two microwave signals polarized in different ways from at least two different measurement points through the dielectric pipe, the polarization receiver antennae being arranged to receive substantially only the signal that is polarized suitably for that particular antenna and has passed through the dielectric pipe, and the flow meter comprising a correlator for calculating the cross correlation or the like between at least two signals, whereby, the distance between the measurement points being known, the flow meter is arranged to use the best correlation result to determine the flow rate.

The method and flow meter of the invention provide several advantages. By using two different frequencies, polarizations and/or modulations, a microwave is prevented from passing crosswise between the transmitter and receiver antennae, ensuring an unambiguous measurement result.

The result can be further improved by directing different microwave signals in different ways. The flow can be measured from outside the pipe or the like without breaking the pipe. Installing the meter in the pipe does not cause a risk of leakage. The meter can be installed in the measurement site any time, even with the process going on. The only requirement set by the measurement on the material to be measured is that it is permeable to microwave signals and dielectric in a way that modulates the microwave signal. The inventive solution enables the flow rate to be measured even if the pipe is not full.

BRIEF DESCRIPTION OF THE FIGURES

In the following the invention will be described in greater detail in association with preferred embodiments with reference to the attached drawings, in which.

DETAILED DESCRIPTION OF THE INVENTION

Figure 1:
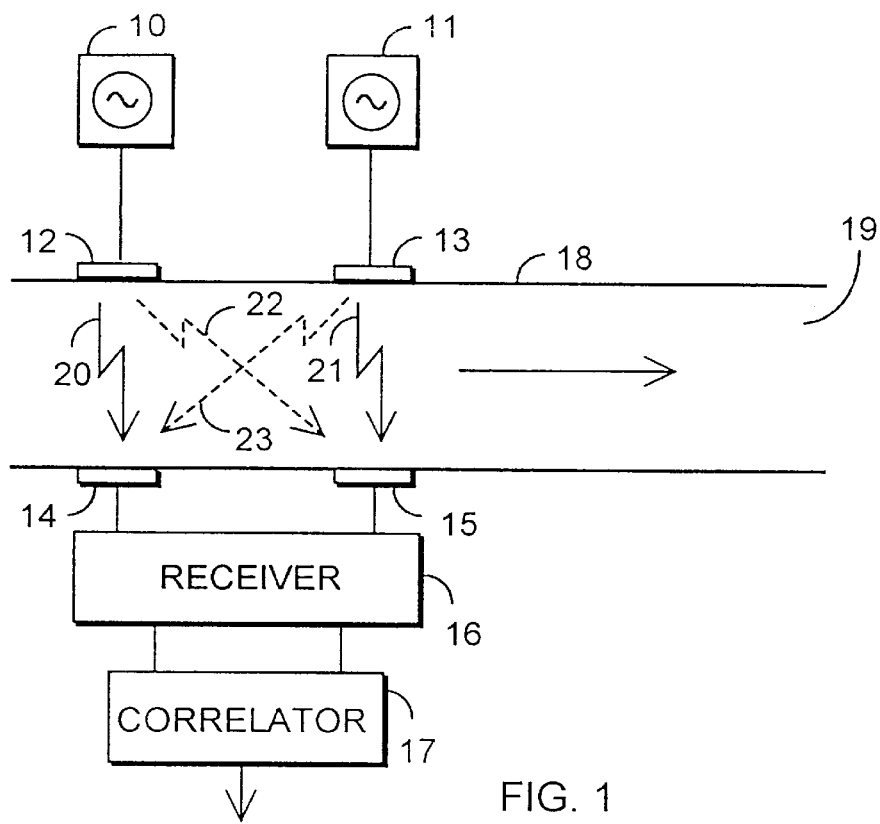
FIG. 1 shows the principle of a measuring arrangement.

FIG. 1 shows a flow meter solution according to the invention, comprising a microwave transmitter 10 and 11, two transmitter antennae 12 and 13, two receiver antennae 14 and 15, a receiver 16 and a correlator 17. The measuring arrangement also comprises a pipe 18 and a material 19 flowing in the pipe. In the solution of the invention, the pipe 18 or the like does not have to be full of the flowing material 19, but it is sufficient that the pipe 18 contains at least some material. In this solution, signals from the transmitters 10 and 11 are transmitted via the antennae 12 and 13 through the pipe 18 and the flowing material 19. The measurement points are within the travel range of the signals 20 and 21, and the distance between the measurement points is known. When the signals 20 and 21 are transmitted in the direction of the normal of the surface of the pipe 18 through the pipe 18, the distance is the same as the distance between the transmitter antennae 12 and 13, which is easy to measure. The receiver antennae 14 and 15 receive the measurement signals 20 and 21, and the receiver 16 amplifies and indicates the signals in accordance with prior art. The correlator 17 then compares the similarity of the signals 20 and 21 by means of correlation. The signals resemble each other, i.e. correlate best, at such a delay, i.e. after such a time, that the flowing material 19 uses to travel the distance between the antennae 12 and 13 and/or 14 and 15, since the flowing material 19 modulates the signals 20 and 21. When the flowing material 19 flows from left to right in FIG. 1, and the flow rate is such that the material within the measurement range between the antennae 12 and 14 moves in τ seconds to the measurement range between the antennae 13 and 15, the correlation between the signals 20 and 21 is at its highest when the signal 20 is delayed by τ seconds in relation to the signal 21. When the time spent by the flowing material for the distance between the measurement points is known, the flow rate can be easily formed. The flow rate is v=s/τ, where v is the flow rate, s is the distance between the measurement points (=the distance between the signals 20 and 21), and τ is the time spent by the flowing material 19 for the distance between the antennae, measured by the correlation.

In an ideal case, the receiver antenna 14 receives the signal of the transmitter 12 only, and similarly the receiver antenna 15 receives the signal of the transmitter antenna 13 only. However, in practice the measurement is interfered with by crosstalk, whereby some 22 power of the transmitter 10 is received at the receiver antenna 15 and some 23 power of the transmitter 11 is received at the receiver antenna 14. This is particularly disturbing in prior art solutions in which both transmitters 10 and 11 transmit at the same frequency or in the same band. In the solution of the invention these interferences can be avoided since the transmitters 10 and 11 operate at different frequencies.

Figure 2:
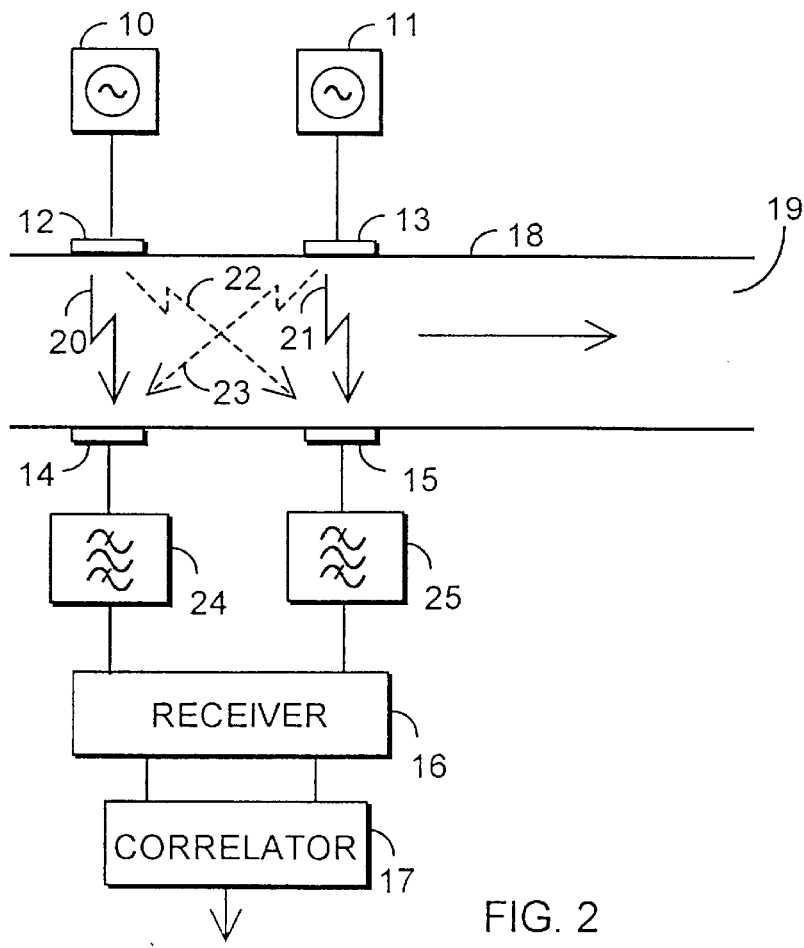
FIG. 2 shows a measuring arrangement in which signals are separated from each other by filtering.

FIG. 2 shows a flow meter solution according to the invention, comprising microwave transmitters 10 and 11, two transmitter antennae 12 and 13, two receiver antennae 14 and 15, a receiver 16 and a correlator 17. The measuring arrangement also comprises a pipe 18 and a material 19 flowing in the pipe. In this inventive solution, the transmitters 10 and 11 transmit signals at different frequencies, the signals being filtered with filters 24 and 25 associated with the receiver 16. In this way the received signals can be separated from each other and hence the effect of crosstalk interferences 22 and 23 can be removed from the measurement result. The filters 24 and 25 can be bandpass filters, whereby the filter 24 only passes the signal 20 and the filter 25 only the signal 21 through to the actual receiver 16. The filters 24 and 25 can also be low-pass and high-pass filters. Let us assume that the frequency of the signal 20 is below that of the signal 21. In this case the filter 24 can be a low-pass filter whose upper frequency limit exceeds the frequency of the signal 20, but is below the frequency of the signal 21. The filter 25, in turn, can be a high-pass filter whose lower limiting frequency slightly exceeds the frequency of the signal 20 but is lower than the frequency of the signal 21.

The inventive solution, in which the signals 20 and 21 have different frequencies, can be further improved by polarizing the signals 20 and 21 in different ways. On the other hand, when the signals 20 and 21 are polarized in different ways in the inventive solution, the signals 20 and 21 can also have the same frequency, and the transmitters 10 and 11 can then be replaced with one transmitter. In this case the transmitter antenna 12 and the receiver antenna 14 operate at the same polarization level, and, similarly, the transmitter antenna 13 and the receiver antenna 15 operate at the same polarization level. With the polarization level angle of the signals 20 and 21 being 90°, the best possible separation is achieved for the signals. With more than two measurement signals 20 and 21, the angle between the polarization levels remains below 90°, and hence polarization-based separation of the signals 20 and 21 is at its best with two measurement signals. Instead of level polarization, right and left hand circular polarization may also be used to implement the polarization.

Figure 3:
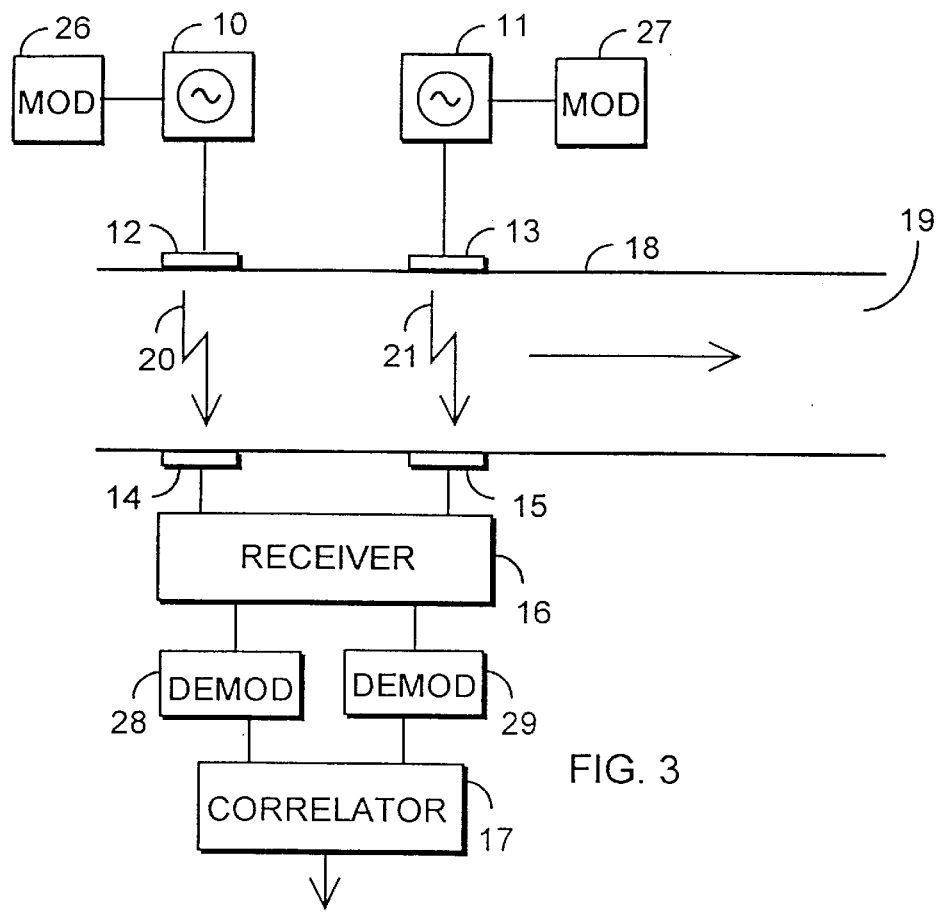
FIG. 3 shows a measuring arrangement in which the signals are modulated.

FIG. 3 shows an inventive solution in which the signals 20 and 21 are separated from each other by modulation. In this case the signals 20 and 21 can have either different or the same frequencies. If two or more signals 20 and 21 at the same frequency are used, the transmitters 10 and 11 can be replaced with one transmitter. A modulator 26 modulates the signal 20 of the transmitter 10 in one manner. A modulator 27, in turn, modulates the signal 21 of the transmitter 11 in a different manner. The various prior art modulation methods are known to persons skilled in the art, and are therefore not explained in any greater detail herein. In this way the signals 20 and 21 can be separated from each other in the receiver 16 which comprises demodulators 28 and 29. The demodulator 28 indicates the modulation of the modulator 26 from the signal 20, simultaneously indicating the interference effect caused by the signal 21 and received by the antenna 14. Similarly, the demodulator 29 removes the modulation of the modulator 27 from the signal 21 and removes the interference effect caused by the signal 20 and arrived via the antenna 15.

Figure 4:
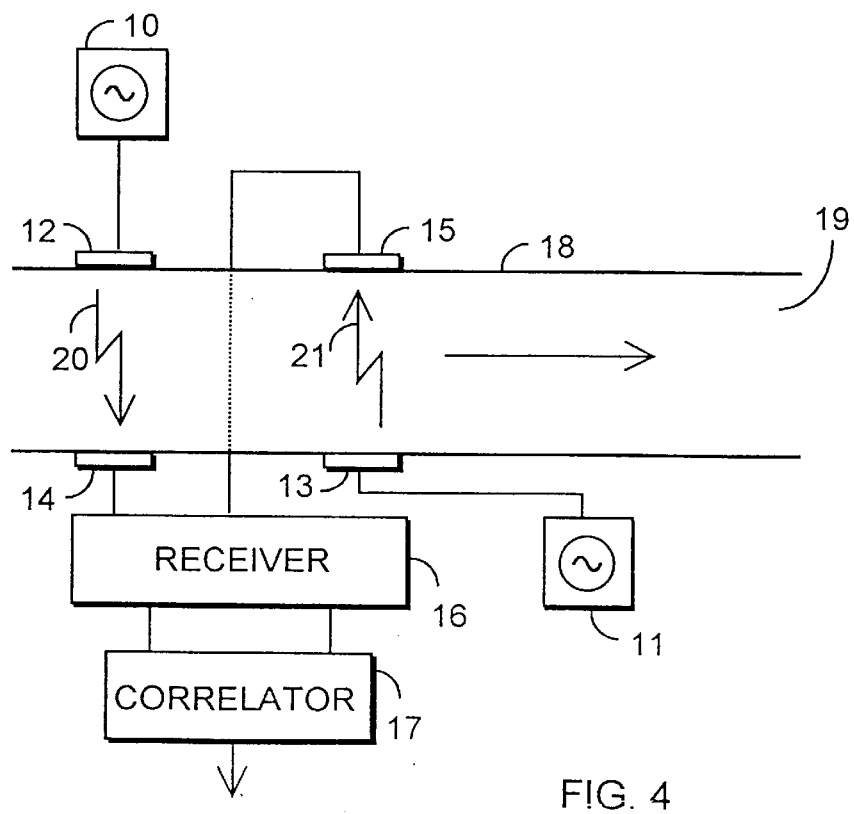
FIG. 4 shows a measuring arrangement in which signals have different directions.

FIG. 4 shows a third way of limiting the interference between the signals 20 and 21. In this solution, the antennae 12 and 13 are directed away from one another towards the receiver antennae 14 and 15.

In the inventive solution all different alternatives can be combined or used alone as needed. The signals 20 and 21 with different frequencies can be simultaneously polarized, modulated and directed advantageously and separated one from another upon reception by filtering (bandpass filtering or high-pass/low-pass filtering), polarization, modulation and steerable antennae.

Once the cross-sectional area A of the pipe is known, the flow rate can be used to determine also the volume flow rate P by multiplying the flow rate v with the cross-sectional area A of the pipe 18, i.e. P=V/τ=A·s/τ=A·v. This also allows the production volume to be defined. The production volume can be further specified by measuring the consistency of the flowing material and the fill rate of the pipe, which can be measured by radioactive consistency measurement, for example. In a flow meter solution shown in FIGS. 1 to 4, the flow meter also preferably determines the flow rate and, if necessary, the volume flow rate. This takes place e.g. in the correlator 17. In the solution of the invention, the flow rate is preferably determined as an average value from several measurements. This allows the measurement result to be averaged from several measurements performed with two transmitter antennae 12 and 13 and two receiver antennae 14 and 15 and/or still more transmitter antennae and receiver antennae, whereby the measurement is carried out at several measurement points, and the flow rate in the pipe 18 is determined as the average value of the measurement results of all these measurement points. The accuracy of the measurement increases as the number of single measurement results taken into account in determining the final value increases.

Figure 5:
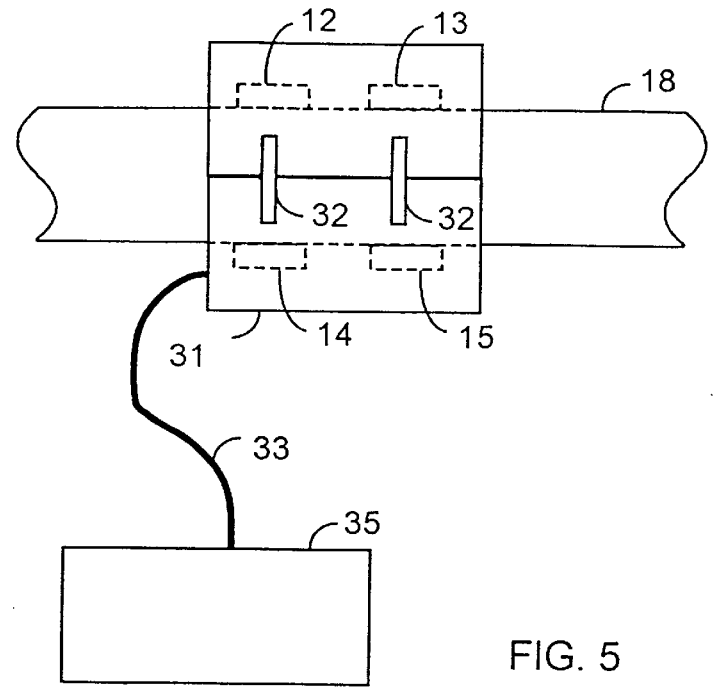
FIG. 5 shows the fastening of a flow meter to a pipe.
Figure 6:
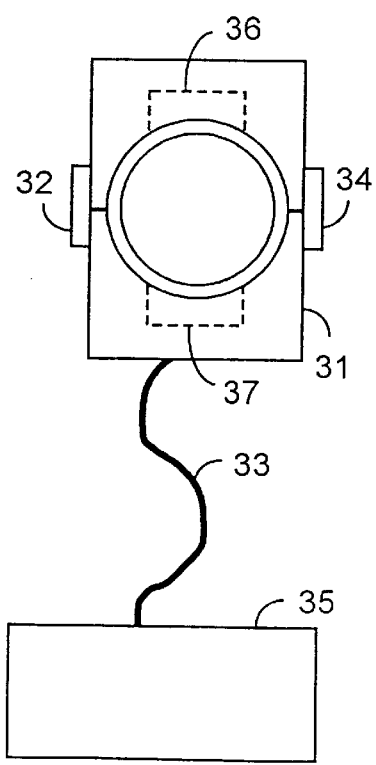
FIG. 6 shows the fastening of a flow meter to a pipe.

FIG. 5 shows a possible structure of a flow meter. Elements 31 to be fastened around the pipe 18 comprise a hinge 32 by means of which the elements 31 can be easily fastened and detached. The elements 31 comprise at least the transmitter antennae 12 and 13 and the receiver antennae 14 and 15. FIG. 6 shows the elements 31 in the direction of the pipe 18. On the opposite side of the hinge 32, the elements 31 comprise a locking element 34 with which the antennae in the elements 31 are locked in place to the pipe 18 for the measurement. In FIGS. 5 and 6, an element 35 stands for the receiver 16 and the correlator 17, which are combined to the antennae 12 to 15 by a cable 33. In FIG. 6, an element 36 stands for the transmitter antennae 12 and 13, and an element 37 for the receiver antennae 14 and 15.

Figure 7:
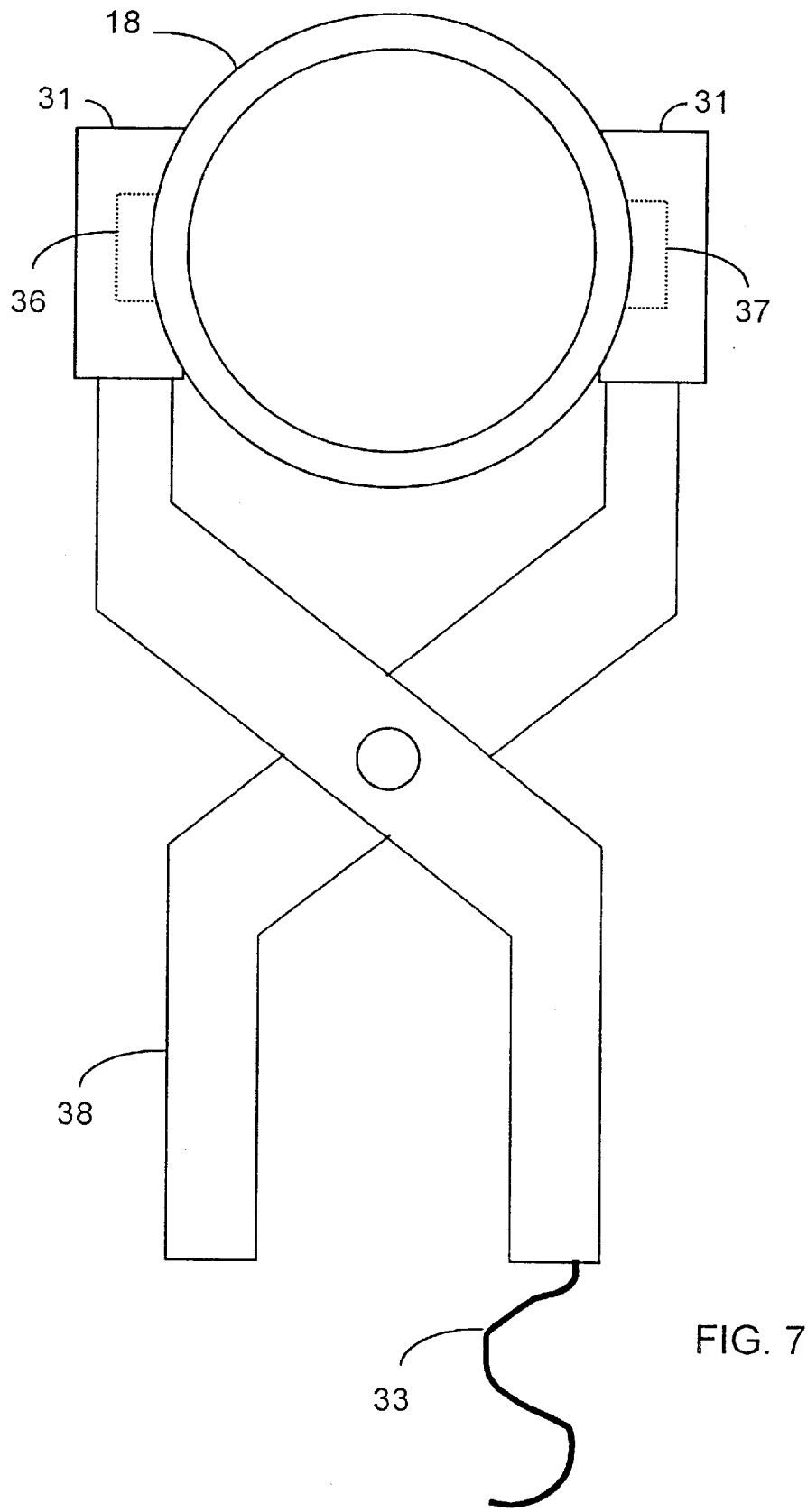
FIG. 7 shows a preferred structure of a flow meter.

FIG. 7 shows a preferred structure of the inventive solution. The inventive meter is a clamp-shaped means 38 comprising the elements 31 and the transmitter and receiver antennae 36 and 37. The clamp-like means 38 of the invention can easily be pressed against the pipe 18 for purposes of measurement. The solution is easy to fasten and detach repeatedly.

The correlator 17 forms the correlation C(τ) in a general case according to the formula (1)

$$C(\tau)=\int x(t)\cdot y(t-\tau)dt \qquad (1)$$

where x(t) is the signal 21 and Y(t–τ) is the signal 20, delayed by τ. The value of the correlation is calculated with several delay values, so that τ∈[$t_0$, . . . , $t_n$], where $t_0$ is the shortest possible delay and $t_n$ the longest possible delay. The shortest and longest possible delays determine the highest and lowest measurable flow rate. The measurement range τ∈[$t_0$, . . . , $t_n$] is determined case-specifically. In the inventive solution, the correlator 17 operates electronically and can be analog or digital.

In the inventive solution the flowing material 19 can be any liquid material permeable to microwave radiation. The inventive solution is particularly suitable for use e.g. in measuring the flow of pulp in the rubber tube system of a soft tissue machine. The tubes, typically totaling about 40, are used to transfer pulp with a consistency of about 1% from the bypass manifold to the head box. When a paper machine is taken into use, the flows in the tubes have to be adjusted and for this purpose the flows need to be measured. It is practical to carry out the measurement with the device of the invention, since the measurement device can be easily moved from one tube and place to another.

Even though the invention has been described above with reference to the example according to the attached drawings, it is obvious that the invention is not restricted thereto, but can be modified in various ways within the scope of the inventive idea disclosed in the attached claims.

We claim:

1. In a method of measuring the flow rate of a material with poor electrical conductivity in a dielectric conduit, the improvement to the method comprising:
   transmitting at least two different microwave signals from respective different measurement points a known distance apart through the conduit and material;
   receiving a combination of the signals transmitted from the respective measurement points through the conduit and material;
   separating the signals received in the combination from each other on a basis of the respective measurement points from which the signals were transmitted; and
   forming cross correlations between at least some of the separated signals for the measuring of the flow rate on a basis of a best one of the cross correlations.

2. A method as claimed in claim 1, wherein the signals are separated from each other by bandpass filtering upon reception.

3. A method as claimed in claim 1, wherein the first signal is low-pass filtered and the second signal is high-pass filtered upon reception.

4. A method as claimed in claim 1, wherein the separation of he signals is improved by selectively directing the transmitted signals in different directions.

5. A method as claimed in claim 1, wherein the measured flow rate is determined as an average of respective measured flow rates determined by more than one iteration of the method.

6. A method as claimed in claim 1, wherein, the cross-sectional area of the conduit being known, the flow rate is used to determine the volume flow rate, allowing the production volume to be defined.

7. A method as claimed in claim 1 wherein the dielectric conduit is a rubber tube in a soft tissue machine.

8. The method claim 1, wherein the respective microwave signals are transmitted by respective pairs of transmitter and receiver antennae across the diameter of the dielectric pipe.

9. The method of claim 1, wherein the different signals have the same frequency.

10. In a method of measuring the flow rate of a material with poor electrical conductivity in a dielectric conduit, the improvements to the method comprising:

transmitting at least two microwave signals having the same frequency but different polarizations from respective different measurement points a known distance apart through the conduit and material;

receiving a combination of the signals transmitted from the respective measurement points through the conduit and material;

separating the signals received in the combination from each other by the polarizations; and forming cross correlations between at least some of the separated signals for the measuring of the flow rate on a basis of a best one of the cross correlations.

11. A method as claimed in claim 10, wherein the separation of the signals is improved by transmitting modulated signals so that the signals are also separated from each other by demodulation.

12. The method of claim 10, wherein the respective microwave signals are transmitted by respective pairs of transmitter and receiver antennae across the diameter of the dielectric pipe.

13. In a method of measuring the flow rate of a material with poor electrical conductivity in a dielectric conduit, the improvements to the method comprising:

transmitting at least two microwave signals having the same frequency but modulated in different ways from respective different measurement points a known distance apart through the conduit and material;

receiving a combination of the signals transmitted from the respective measurement points through the conduit and material;

separating the signals received in the combination from each other by demodulation; and forming cross correlations between at least some of the separated signals for the measuring of the flow rate on a basis of a best one of said correlations.

14. A method as claimed in claim 13, wherein the separation of the signals is improved by using different polarization in the signals transmitted, whereby the signals are also separated from each other by polarization.

15. The method of claim 13, wherein the respective microwave signals are transmitted and received by respective pairs of transmitter and receiver antennae across the diameter of the dielectric pipe.

16. In a flow meter for measuring the flow rate of material with poor electrical conductivity in a dielectric conduit, the flow meter comprising at least two transmitter antennae, a receiver antenna, and a correlator, wherein the improvement comprises:

means for transmitting at least two different microwave signals from respective ones of the transmitter antennae at respective different measurement points a known distance apart through the conduit and material, the receiver antenna receiving a combination of the signals transmitted from the respective different measurement points through the conduit and material; and means for separating signals from the received combination of signals so that the correlator forms cross correlations between two separated signals from respective ones of the different measurement points and uses a best one of the cross correlations to determine the measured flow rate.

17. A flow meter as claimed in claim 16, wherein the flow meter is arranged to separate the signals from each other by using a low-pass filter and a high-pass filter.

18. A flow meter as claimed in claim 9, wherein the transmitting antennae and the receiving antenna are polarization antennae.

19. A flow meter as claimed in claim 16 wherein the flow meter is further arranged to separate signals transmitted by respective transmitter antennae in respective different directions.

20. A flow meter as claimed in claim 16, wherein the flow meter is arranged to determine the flow rate as an average value on the basis of more than one measurement.

21. A flow meter as claimed in claim 16, wherein, the cross-sectional area of the pipe being known, the flow meter is arranged to determine the volume flow rate by means of the flow rate, allowing the production volume to be defined.

22. A flow meter as claimed in claim 16, wherein the transmitting and receiving antennae are adapted to measure the flow rate in a rubber tube of a soft tissue machine.

23. A flow meter as claimed in claim 16, wherein the flow meter comprises a transmitter antenna and a receiver antenna adapted to be pressed to a pipe, the receiver antenna and transmitter antenna being repeatedly attachable and detachable without damage to the pipe, and easily movable from place to place on a pipe and from one pipe to another.

24. The flow meter of claim 23 further comprising a clamp adapted to mount the transmitter and receiver antennae on opposite sides of a pipe without opening the pipe or the interrupting a flow of material in the pipe.

25. The flow meter of claim 16, wherein the different signals are transmitted by the respective antennae towards corresponding antennae across the diameter of the pipe.

26. The flow meter of claim 16, wherein the different signals have the same frequency.

27. A flow meter for measuring the flow rate of a material with poor electrical conductivity in a dielectric conduit, the flow meter comprising at least two transmitter antennae, a receiver antenna, and a correlation, wherein the improvement comprises:

a modulator arranged to modulate microwave signals transmitted from respective ones of the transmitter antennae in different ways, the transmitter antennae being arranged to transmit the microwave signals from respective different measurement points a known distance apart through the conduit and material, the receiver antenna receiving a combination of the signals from the respective different measurement points through the conduit and material;

a demodulator arranged to separate signals from the received combination of signals by demodulation so that the correlator forms cross correlations between the separated signals from respective ones of the different measurement points and uses a best one of the cross correlations to determine the measured flow rate.

28. The flow meter of claim 27, wherein the different signals are by the respective transmitter antennae towards corresponding receiver antennae across the diameter of the pipe.

29. A flow meter for measuring the flow rate of a material with poor electrical conductivity in a dielectric conduit, the flow meter comprising at least two transmitter antennae, a receiver antenna, and a correlator, wherein the improvement comprises:

means for transmitting microwave signals polarized in different ways from respective ones of the transmitter antennae at respective different measurement points a known distance apart through the conduit and material, the receiver antenna receiving a combination of the signals from the respective different measurement points that have passed through the conduit and material; and means for separating signals from the received combination of signals by the ways of the polarizations so that the correlator forms cross correlations between the separated signals from respective ones of the different measurement points and uses a best one of the cross correlations to determine the measured flow rate.

30. A flow meter as claimed in claim 29, wherein the flow meter also comprises modulators, and the flow meter is arranged to transmit the signals modulated in different ways and to separate the signals from each other by using a demodulator.

31. The flow meter of claim 29, wherein the different signals are transmitted by respective transmitter antennae towards corresponding receiver antennae across the diameter of the pipe.

* * * * *